Sept. 27, 1932.  V. W. EDWARDS  1,879,141
COMBINED SHUTTER AND FILM WINDING MECHANISM FOR PHOTOGRAPHIC CAMERAS
Filed June 18, 1931
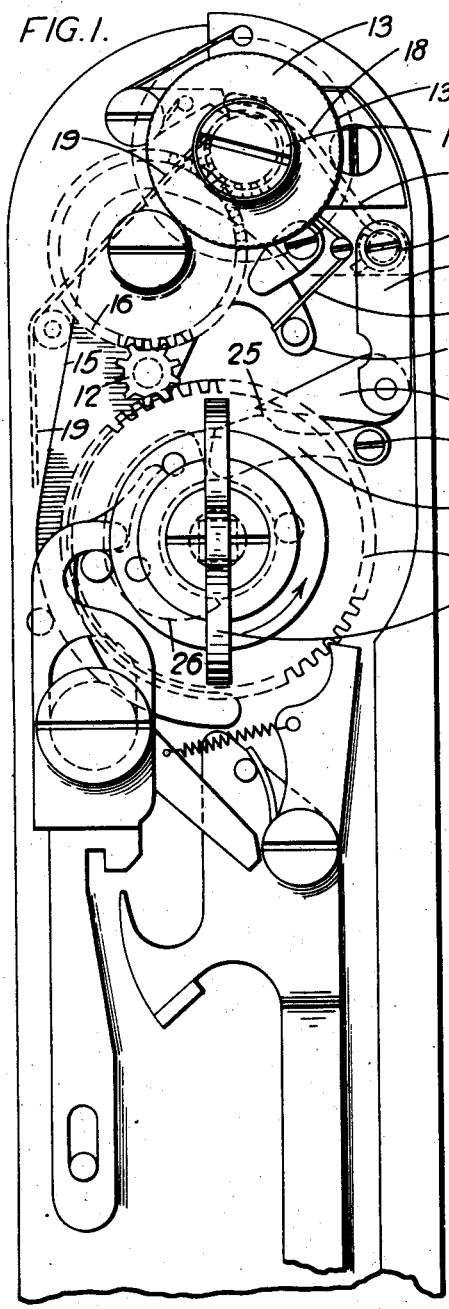
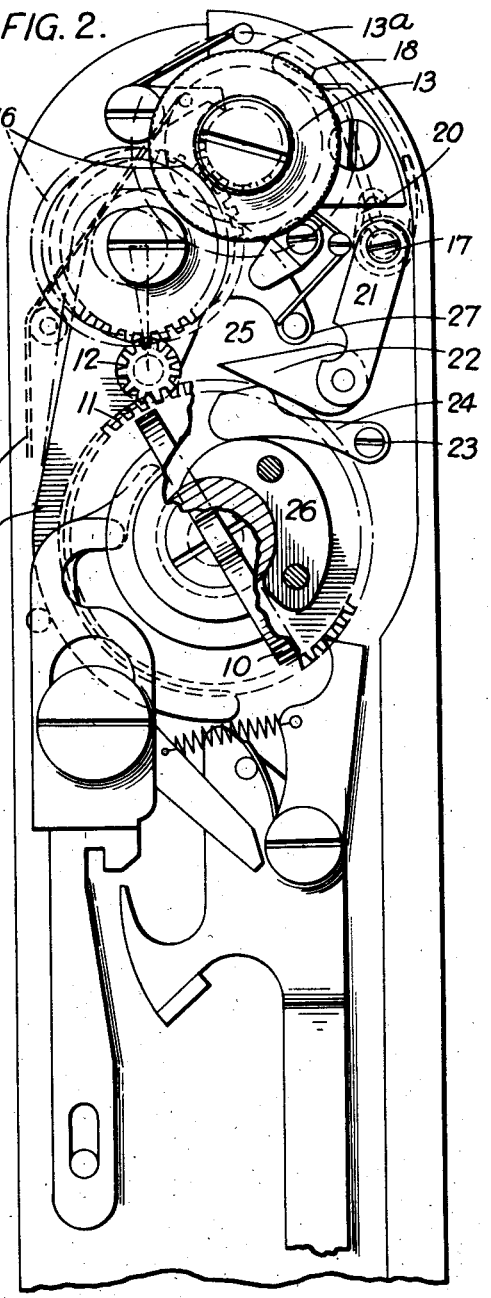
INVENTOR
V. W. EDWARDS Patented Sept. 27, 1932

1,879,141

UNITED STATES PATENT OFFICE

VALENTINE WILLIAM EDWARDS, OF LONDON, ENGLAND, ASSIGNOR TO THE HOUGHTON BUTCHER MANUFACTURING COMPANY LIMITED, OF LONDON, ENGLAND, AN ENGLISH LIMITED LIABILITY

COMBINED SHUTTER AND FILM WINDING MECHANISM FOR PHOTOGRAPHIC CAMERAS

Application filed June 18, 1931, Serial No. 545,281, and in Great Britain July 18, 1930.

This invention relates to roll film photographic cameras of the type having mechanism for advancing the roll film simultaneously with the setting of a focal plane shutter, and particularly to the type intended for use with ordinary roll-films as apart from those which use short lengths of perforated cinematograph film. A defect of such devices is due to the progressively increasing diameter of the roll of film on the take-up spool as successive exposures are made, and since the number of turns given to the take-up spool is constant for each setting of the shutter a progressively longer strip of film is wound forward after each exposure, resulting in a progressively wider gap or unused portion of film between exposures. This was undoubtedly a drawback but was not of very serious moment when only six exposures were provided on a film. Recently, however, films are being marketed which provide eight exposures, and the defect above mentioned has become more objectionable. The primary object of the present invention is to provide means for compensating for the increasing diameter of the take-up roll so as to give a substantially constant gap between exposures throughout the length of the film.

The invention relates more particularly to the type of synchronous shutter and film winding mechanism in which toothed wheels on the film winder and the shutter spindle respectively are uncoupled when the film has been advanced to the desired extent, the film winder being thereupon freed to allow the winding of the shutter spindle to proceed to the "set" position for different shutter openings or "time" exposures. Such mechanism is described for instance in the specification of U. S. Patent 1,839,953 to Alfred J. Denniss and Walter Dockree, January 5, 1932.

According to the present invention, in a roll film photographic camera having combined focal-plane shutter and film winding mechanism wherein the shutter-setting mechanism is adapted to be disconnected automatically from the film winder during the winding operation and before the shutter is fully set means co-operating with the film winder are provided to control the disconnection of the latter from the shutter winder in accordance with the diameter of the roll of film in such a manner that a substantially constant length of film is wound forward at each setting of the shutter.

In a preferred form of construction the winding mechanism comprises a train of wheels including a wheel intermediate the shutter and film winding wheels and mounted on a movable arm for disengagement from the film winding wheel by means of a cam stud or other equivalent device carried by the shutter winding wheel or by a wheel permanently in mesh therewith and the disconnecting means comprises a wedge-shaped member interposed between the said cam (or equivalent device) and the movable arm carrying the intermediate wheel, the wedge-shaped member being in operative connection with a movable member making contact with the roll of film on the film winding spool in such a manner that as the diameter of the roll of film increases the movable member contacting therewith causes the wedge-shaped member to be inserted further between the cam or the like and the movable arm carrying the intermediate wheel.

In order to reduce friction and ensure correct lifting action the wedge-shaped member may be arranged so as not to be acted upon directly by the cam or the like, an idle rocker arm being interposed between cam and wedge, and the latter may also with advantage be pivotally mounted on an arm or the like member in direct connection with the member making contact with the film roll. This contact is maintained by spring means of any convenient type.

In order that the present invention may be fully understood and readily carried into practice one constructional application of the invention to a roll film photographic camera embodying film and shutter winding mechanism as described in the specification of U. S. Patent 1,839,953 to Alfred J. Denniss and Walter Dockree, January 5, 1932, is illustrated in the accompanying drawing, of which:—

Figs. 1 and 2 show in side view combined shutter and film winding mechanism of the kind described in said Patent No. 1,839,953.

In Fig. 1 the take-up spool for the film is shown practically empty of film, the unexposed film being all wound on the other (full) spool (not shown in the drawing), and in Fig. 2 the take-up spool is shown nearly full of exposed film and part of the mechanism is shown broken to expose underlying parts.

Referring to the drawing, the winding mechanism comprises a handle 10 attached to a toothed wheel 11 in mesh with a toothed wheel 12 mounted on the shutter spindle (not shown). A film take-up spool 13 is turned by a milled head 13ª fast with a toothed wheel 14. An arm 15 pivoted about the shutter spindle carries an intermediate wheel 16 in mesh with the shutter winding wheel 12 and normally in mesh also with the film winding wheel 14. A transverse rocking shaft 17 carries a flat tongue 18 which is pressed by a spring 20 (Fig. 2) against the outer surface of a film 19 where it is wound on the spool 13. The shaft 17 also carries an arm 21 to the end of which is pivoted a wedge-shaped member 22. Immediately below the latter is pivoted at 23 an idle rocker 24 having a rounded projection 25 adapted to bear against the member 22. The wheel 11 carries a cam 26, which, on rotation of the wheel 11 in the direction of the arrow in Fig. 1, lifts the rocker 24 and thereby raises the wedge shaped member 22 (see Fig. 2). Immediately above the latter is situated a projection 27 of the arm 15 which projection in turn is lifted by the wedge 22 to rock the arm and thus carry the wheel 16 out of engagement with the film winding wheel 14.

When the film spool 13 is nearly empty (as shown in Fig. 1) the thin end of the wedge 22 is interposed between the rocker 24 and the projection 27, and the handle 10 and wheel 11 must be turned till the full lift of the cam 26 is experienced by the rocker 24 before the intermediate wheel is disengaged. As the diameter of the film roll on the spool 13 increases with continued winding the tongue 18 is progressively lifted, thus carrying the wedge 22 progressively further into the gap between the projections 25 and 27 so that in each successive operation of shutter and film wind the film spool is disconnected at an earlier stage than in the preceding winding operation.

In this way the effect of the progressively increasing diameter of the film spool as the film is wound thereon is compensated by imparting progressively fewer winding turns to the spool at each winding operation.

The rounded projection 25 of the rocker 24 ensures that the action of the cam 26 is transmitted normally to the wedge 22 and tends to reduce friction and ensure correct lifting action.

A spring 28 ensures the return of the arm 15 and re-engagement of the wheels 14, 16, after the shutter has been released.

What I claim is:—

1. A roll-film photographic camera comprising a focal-plane shutter, a shutter winding spindle, a film winding spindle, combined shutter and film winding mechanism and disconnecting means for freeing the film winding spindle from the winding mechanism when the correct length of film has been wound for a new exposure, irrespective of the increasing diameter of the roll of film on the film winding spindle, and before the shutter is fully set.

2. A roll-film photographic camera comprising a focal-plane shutter, a film winder adapted to drive a film take-up spool, combined shutter and film winding mechanism, disconnecting means for disengaging the film winder from the winding mechanism before the shutter is fully set and means co-operating with the film winder for compensating the increasing diameter of the roll of film on the film take-up spool and for regulating the action of the disconnecting means to disengage the film winder at each wind after winding on a predetermined constant length of film.

3. A roll-film photographic camera comprising a focal-plane shutter, combined shutter setting and film winding mechanism including a drive for a film take-up spool, means for disconnecting the film take-up spool drive from the winding mechanism before the shutter is fully set, a movable member adapted to make contact with the surface of the roll of film on the take-up spool and means actuated by the said movable member and co-operating with the said disconnecting means for progressively advancing at each wind the disengagement of the take-up spool drive to compensate the increasing diameter of the roll of film on the take-up spool and to ensure that a constant length of film is wound forward before each exposure.

4. A roll-film photographic camera including a focal-plane shutter and comprising a shutter winding spindle, a driving key for a film take-up spool, a gear wheel fast on the shutter winding spindle, a gear wheel fast on the take-up spool driving key, an intermediate idle wheel mounted on a movable arm for disengagement from the spool driving wheel, a cam operatively connected with the shutter winding wheel and adapted to effect disengagement of the intermediate wheel from the film winding wheel before the shutter is fully set, a movable member adapted to make contact with the surface of the roll of film on the take-up spool and a wedge-shaped element operatively connected with the said movable member and interposed between the said cam and the arm carrying the intermediate wheel and adapted to advance the disengagement of the intermediate wheel at each successive wind in accordance with the increase in diameter of the roll of film on the take-up spool.

5. A roll-film photographic camera including a focal-plane shutter and comprising a shutter winding spindle, a driving key for a film take-up spool, a gear wheel fast on the shutter winding spindle, a gear wheel fast on the take-up spool driving key, an intermediate idle wheel mounted on a movable arm for disengagement from the spool driving wheel, a cam operatively connected with the shutter winding wheel and adapted to effect disengagement of the intermediate wheel from the film winding wheel before the shutter is fully set, an idle rocker adapted to be rocked by the cam, a movable wedge-shaped spacing member interposed between the idle rocker and the movable arm carrying the intermediate wheel and a movable member operatively connected with the wedge-shaped member and adapted to make contact with the surface of the roll of film on the take-up spool and to regulate the penetration of the wedge-shaped spacing member between the rocker and the movable arm in accordance with the diameter of the roll of film on the take-up spool.

6. A roll-film photographic camera having a focal-plane shutter, a shutter winding wheel and a wheel for winding a film take-up spool, said wheels being interconnected by an intermediate wheel mounted on a rockable arm for disengagement from the film winding wheel, a cam operatively connected with the shutter winding wheel, an idle rocker adapted to be lifted by said cam, a tongue adapted to rest on the surface of the roll of film on the take-up spool and a lever arm, said tongue and lever being mounted on a spindle journalled in parallelism with the take-up spool, and a wedge-shaped spacing member pivotally mounted on the end of said lever and interposed between the said idle rocker and the rockable arm carrying the intermediate wheel, the penetration of the wedge-shaped member between rocker and arm being regulated by the tongue and lever in accordance with the diameter of the roll of film on the take-up spool to effect disengagement of the film winding wheel after winding on a constant length of film before each exposure.

7. A roll-film photographic camera having a focal-plane shutter, combined film and shutter winding mechanism including a train of wheels comprising a shutter winding wheel, an intermediate wheel and a film winding wheel for driving a film take-up spool, said intermediate wheel being mounted on a rockable arm for disengagement from the film winding wheel; a cam operatively connected with the shutter and film winding mechanism, an idle rocker adapted to be lifted by the cam, a movable wedge-shaped spacing member interposed between the idle rocker and the rockable arm carrying the intermediate wheel and a movable member held in contact with the surface of the roll of film on the take-up spool by spring means and connected with the wedge-shaped member so as to regulate the penetration of the wedge-shaped spacing member between rocker and arm in accordance with the diameter of the roll of film on the take-up spool to ensure the winding of a constant length of film before each exposure.

8. A roll-film photographic camera having a focal-plane shutter and comprising a shutter winding spindle, a film winding spindle with a key for engaging a film take-up spool, an auxiliary spindle, and an operating spindle carrying an external handwinding key, said spindles being parallel and journalled in fixed bearings, constantly meshing gear wheels carried by the shutter and hand winder spindles, a gear wheel on the film winding spindle, a rocking arm pivoted about the shutter spindle and carrying an intermediate wheel meshing with the shutter wheel and normally engaging also with the film winding wheel, a cam on the hand winder spindle, an idle rocker actuated by the cam, a tongue fast on the auxiliary spindle, spring means holding said tongue in contact with the surface of the roll of film on the take-up spool, a lever fast on the auxiliary spindle a wedge-shaped spacing member pivoted on the end of said lever and arranged to penetrate between the idle rocker and a projection on the arm carrying the intermediate wheel so that when the hand key has been wound through a certain angle the cam moves the intermediate wheel out of engagement with the film winding wheel through the intervention of the idle rocker, the wedge-shaped member and the projection of the rocking arm, the degree of winding before such disengagement being regulated by the degree of penetration of the wedge-shaped member which is controlled by the diameter of the roll of film on the take-up spool through the tongue on the auxiliary spindle.

VALENTINE WILLIAM EDWARDS.